(12) United States Patent
Marasco et al.

(10) Patent No.: US 8,655,626 B2
(45) Date of Patent: Feb. 18, 2014

(54) MULTIPLE DAMAGE METHOD FOR STRUCTURAL DESIGN OPTIMIZATION

(75) Inventors: Andrea Ivan Marasco, Madrid (ES); Esteban Martino Gonzalez, Madrid (ES); Eduardo Vinue Santolalla, Madrid (ES); Aitor Baldomir Garcia, La Coruna (ES); Jacobo Diaz Garcia, La Coruna (ES); Santiago Hernandez Ibanez, La Coruna (ES)

(73) Assignee: Airbus Operations, S.L., Madrid (ES)

( * ) Notice: Subject to any disclaimer, the term of this patent is extended or adjusted under 35 U.S.C. 154(b) by 188 days.

(21) Appl. No.: 12/784,448

(22) Filed: May 20, 2010

(65) Prior Publication Data

US 2011/0224952 A1    Sep. 15, 2011

(30) Foreign Application Priority Data

Mar. 15, 2010   (ES) .................. 201030373

(51) Int. Cl.
*G06F 17/50*  (2006.01)
*G06F 7/60*  (2006.01)
*G06F 17/10*  (2006.01)

(52) U.S. Cl.
USPC .................................. 703/1; 703/2

(58) Field of Classification Search
USPC ............................................. 703/1, 2
See application file for complete search history.

(56) References Cited

U.S. PATENT DOCUMENTS

| | | | |
|---|---|---|---|
| 7,668,701 B2* | 2/2010 | Latova et al. .............. | 703/1 |
| 2004/0035979 A1* | 2/2004 | McCoskey et al. ........ | 244/117 R |
| 2007/0220454 A1* | 9/2007 | Rassaian et al. ........... | 716/4 |
| 2008/0103740 A1 | 5/2008 | Meizoso Latova et al. | |
| 2011/0233335 A1* | 9/2011 | Santolalla et al. ......... | 244/119 |

OTHER PUBLICATIONS

Ronald Krueger, Isabelle L Paris, T Kevin O'Brien, Pierre J Minguet, Comparison of 2D finite element modeling assumptions with results from 3D analysis for composite skin-stiffener debonding, Composite Structures, vol. 57, Issues 1-4, Jul. 2002, pp. 161-168.*

Norman F.Knight Jr, Navin Jaunky, Robin E Lawson, Damodar R Ambur, Penetration simulation for uncontained engine debris impact on fuselage-like panels using LS-DYNA, Finite Elements in Analysis and Design, vol. 36, Issue 2, Sep. 2000, pp. 99-133.*

A. Turon, P.P. Camanho, J. Costa, C.G. Dávila, A damage model for the simulation of delamination in advanced composites under variable-mode loading, Mechanics of Materials, vol. 38, Issue 11, Nov. 2006, pp. 1072-1089.*

(Continued)

*Primary Examiner* — Aniss Chad
(74) *Attorney, Agent, or Firm* — Seed IP Law Group PLLC (57) ABSTRACT

A computer-aided method for carrying out the structural design of a part subjected to damages having significant effects on its structural integrity, such as an aircraft fuselage section subjected to a propeller blade release event, is provided. The method includes: obtaining finite element models that include all the relevant information for an optimization analysis for the un-damaged part and for at least one possible damaged part; defining at least one design variable of the part and at least one design constraint and one load case for the un-damaged part and for the damaged part; providing at least one simulation module for analyzing one or more failure modes of the part; iteratively modifying the design variables of the part for the purpose of optimizing a target function by analyzing simultaneously the un-damaged part and the at least one damaged part using the at least one simulation module.

6 Claims, 6 Drawing Sheets

(56) References Cited

OTHER PUBLICATIONS

Montalvao, Diogo, N. M. M. Maia, and A. M. R. Ribeiro. "A review of vibration-based structural health monitoring with special emphasis on composite materials." Shock and Vibration Digest 38.4 (2006): 295-326.*

Knight, Jr. et al., "Penetration simulation for uncontained engine debris impact on fuselage-like panels using LS-DYNA," *Finite Elements in Analysis and Design* 36(2):99-133, Sep. 2000.

Krueger et al., "Comparison of 2D finite element modeling assumptions with results from 3D analysis for composite skin-stiffener debonding," *Composite Structures* 57(1):161-168, Jul. 2002.

Montalvão et al., "A Review of Vibration-based Structural Health Monitoring with Special Emphasis on Composite Materials," *The Shock and Vibration Digest* 38(4):295-324, Jul. 2006.

Turon et al., "A damage model for the simulation of delamination in advanced composites under variable-mode loading," *Mechanics of Materials* 38(11):1072-1089, Nov. 2006.

* cited by examiner

MULTIPLE DAMAGE METHOD FOR STRUCTURAL DESIGN OPTIMIZATION

CROSS-REFERENCE TO RELATED APPLICATION

This application claims the benefit under 35 U.S.C. §119(e) of Spanish Patent Application No. ES 201030373, filed Mar. 15, 2010, which application is incorporated herein by reference in its entirety.

FIELD OF THE INVENTION

The present invention relates to a method for optimizing the structural design of parts subjected to the possibility of suffering damages having significant effects on its structural integrity and, more in particular, to a method for optimizing the structural design of aircraft fuselage sections subjected to the possibility of suffering said damages.

BACKGROUND

There are known commercial aircrafts (CBA vector 123, SARA, AVANTI, 7J7) powered with propeller engines located in the rear part of the aircraft supported by the fuselage by means of pylons.

One of the problems raised by this aircraft configuration is related to failure events such as a PBR ("Propeller Blade Release") i.e. an event where a blade of one of the propeller engines comes off and hits the fuselage, a UERF ("Uncontained Engine Rotor Failure"), i.e. an event where a part of the rotor of the engine brakes, it is released and hits the fuselage, an ice shedding event where ice shedding created in the tips of the blades can be thrown at high speed over the fuselage, or any other "Large Damage" event.

The design of the aircraft parts subjected to said events shall therefore take into account all possible damage scenarios and guarantee safety by assuring structural integrity and the capability of maintaining sufficient stability and proceed to an aircraft safe landing.

Said events are particularly important for fuselages made of composite materials that is a current trend in the aircraft industry. Those materials can be less tolerant to the damages caused by said events than other materials, in particular, metallic materials.

The composite materials that are most used in the aeronautical industry consist of fibers or fiber bundles embedded in a matrix of thermosetting or thermoplastic resin, in the form of a preimpregnated or "prepreg" material. Its main advantages refer to:
- Their high specific strength with respect to metallic materials. It is the strength/weight equation.
- Their excellent behavior before fatigue loads.
- The possibilities of structural optimization hidden in the anisotropy of the material and the possibility of combining fibers with different orientations, allowing the design of the elements with different mechanical properties adjusted to the different needs in terms of applied loads.

Although the aircraft industry demand constantly methods for optimizing the structural design of aircraft parts there are not known methods for optimizing the structural design of aircraft parts subjected to multiple damages caused by a PBR event, an UERF event, an ice shedding event or any other similar event.

The present invention is oriented to the attention of said demand.

SUMMARY OF THE INVENTION

One object of the present invention is to provide a computer-aided method for optimizing the structural design of parts subjected to the possibility of suffering multiple damages having significant effects on its structural integrity.

Another object of the present invention is to provide a computer-aided method for optimizing the structural design of an aircraft fuselage section subjected to the possibility of suffering multiple damages having significant effects on its structural integrity.

Another object of the present invention is to provide a computer-aided method for optimizing the structural design of an aircraft fuselage section subjected to the possibility of suffering multiple damages having significant effects on its structural integrity caused by a PBR event and/or an UERF event and/or an ice shedding event.

These and another objects are met by providing a computer-aided method for carrying out the structural design of a part subjected to the possibility of suffering damages having significant effects on its structural integrity optimizing a target function, comprising steps of:
a) Obtaining FE models that include all the relevant information for the optimization analysis for the un-damaged part and for at least one possible damaged part, consisting of a replica of the un-damaged part but eliminating or degrading its damaged zones;
b) Defining at least one design variable of said part;
c) Defining at least one design constraint and one load case for said un-damaged part and for said at least one damaged part;
d) Providing at least one simulation module for analyzing one or more failure modes of said part;
e) Iteratively modifying the design variables of said part for the purpose of optimizing said target function by analyzing simultaneously said un-damaged part and said at least one damaged part using said at least one simulation module.

In one preferred embodiment the load case and the design constraint for said one damaged part are different than the load case and the design constraint for the un-damaged part. Hereby it is achieved a method for optimizing the structural design of a part in which the optimization loop is performed simultaneously for the un-damaged model and several damaged models of the part, defining the same design variables for all models and defining design constraints and loads that can be different for each model.

In another preferred embodiment, said part is an aircraft fuselage section whose configuration comprises at least a skin, several transversal frames and longitudinal stiffeners and the damages having significant effects on its structural integrity are produced by one or more of the following events: a PBR event, an UERF event, an ice shedding event. Hereby it is achieved a method for optimizing the structural design of an aircraft fuselage section subjected to events that may cause quite different damages in different occurrences.

In another preferred embodiment, one possible damaged fuselage section is a replica of the un-damaged fuselage section but eliminating, or degrading the properties of, those zones belonging to said skin, said frames and said stiffeners that will be directly involved in one of said events. Hereby it is achieved a multi-model method for optimizing the structural design of an aircraft fuselage section in which the damaged models are easily obtained.

In another preferred embodiment, the load case for the un-damaged fuselage section is a load case corresponding to standard flight conditions and the load case for a damaged fuselage section is a load case corresponding to a sub-standard flight condition. Hereby it is achieved a method for optimizing the structural design of an aircraft fuselage that provides a damage tolerant fuselage structural design with respect to said damaging events.

In another preferred embodiment, the aircraft fuselage section is made with composite materials, the main design variables are the thickness of skin and frames and the cross area of stringers and the target function to be optimized is the volume of the aircraft fuselage section. Hereby it is achieved a method for optimizing the structural design of an aircraft fuselage section subjected to said damaging events particularly interesting for aircraft fuselage sections made of composite materials as full barrels.

Other features and advantages of the present invention will be understood from the following detailed description in relation with the enclosed drawings.

DETAILED DESCRIPTION OF PREFERRED EMBODIMENTS

Figure 1:
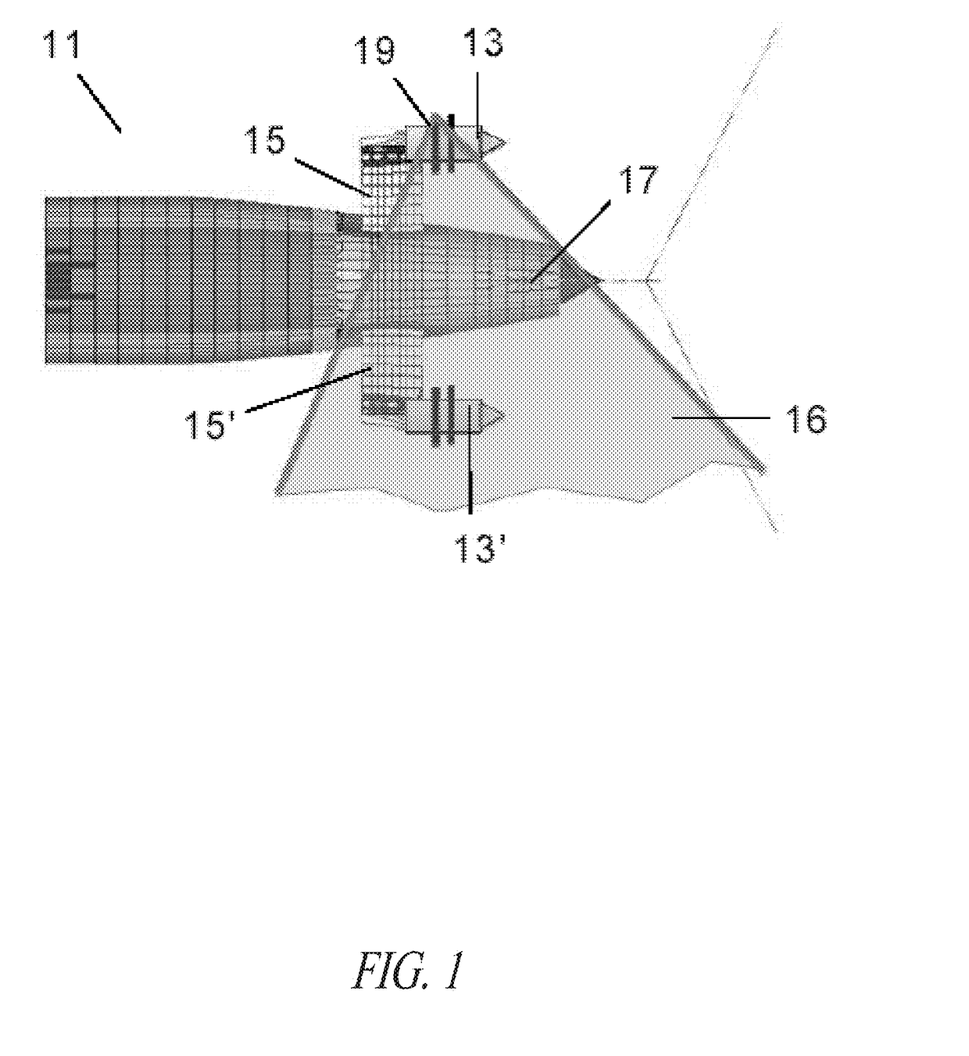
FIG. 1 is a schematic view of the rear part of an aircraft with open-rotor engines showing the area that can be affected by a propeller blade release event.

A preferred embodiment of this invention will be detailed described for optimizing the structural design of a fuselage section of an aircraft with an open-rotor engine such as the aircraft illustrated in FIG. 1 having in its rear part 11 open-rotor engines 13, 13' supported by pylon arms 15, 15'. Although in this description only damages caused by a PBR event will be specifically mentioned, the skilled man will readily understood that the invention is applicable to any type of damages having significant effects on the structural integrity of the fuselage section.

The computer-aided optimizing method according to this invention refers to a design of the fuselage section 17 that assures its structural integrity in the event of the release of the propeller blade 19, or any other of the blades of said engines 13, 13' that may impact the fuselage section 17 following any trajectory within the area 21 that includes all the possible trajectories being considered.

The approach to a structural optimization problem basically consists of the search for a minimum of a target function such as minimum structural volume (and hence weight), subject to a series of conditions that must be fulfilled simultaneously, such as positive safety margins, specific design criteria, manufacturing restrictions or stiffness restrictions.

As it is well known, an optimization problem of the type being considered can be formulated as: given a set of design variables $x=(x_1, \ldots, x_n)$ minimize a target function F subject to constraints $g_j(X) \leq 0$; $j=1, \ldots, J$.

Figure 2:
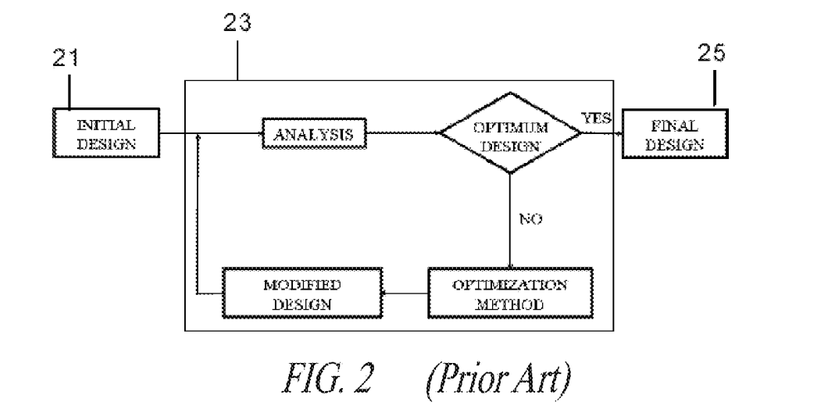
FIG. 2 is a block diagram of a conventional optimization method.

Known computer-aided optimizing methods for optimizing the structural design of parts comprises three phases (see FIG. 2):

A preparation phase using CAE (Computer aided engineering) tools in which an initial design 21 of the part is carried out obtaining a FE (Finite Elements) model and defining design variables and restrictions.

A simulation phase using computerized simulation tools comprising an optimization loop 23 in connection with one or more failure modes.

A result presentation phase using computerized tools for the final design 25.

Figure 3:
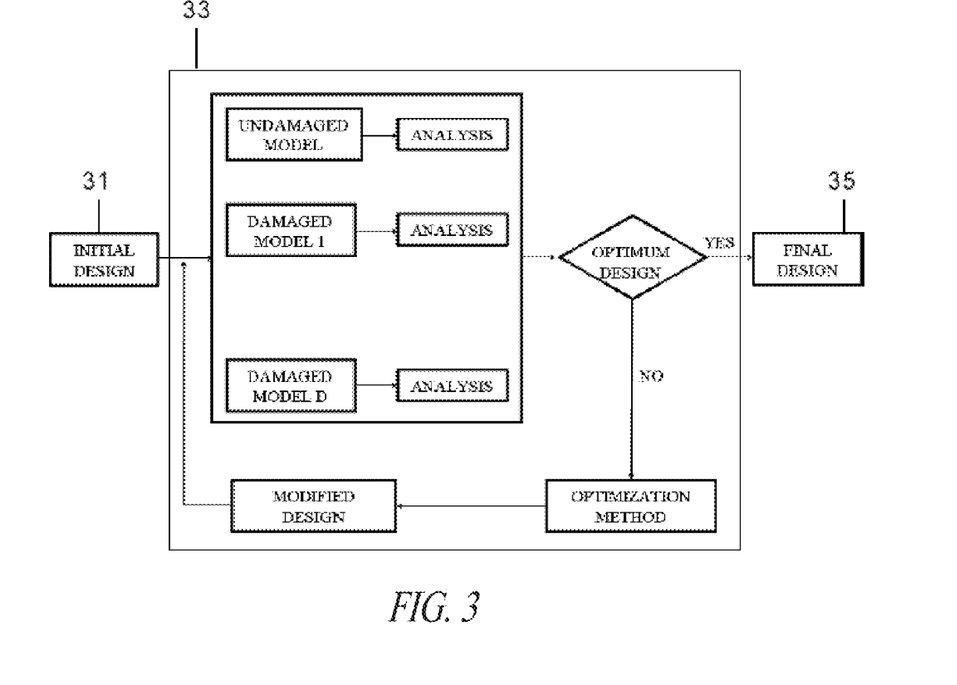
FIG. 3 is a block diagram of an optimization method according to this invention.

The optimizing method according to the present invention (see FIG. 3) for optimizing said aircraft fuselage section also comprises three phases:

A preparation phase in which an initial design 31 of the part is carried out obtaining a FE model and defining design variables and restrictions;

A simulation phase comprising an optimization loop 33 which is done simultaneously for one model corresponding to the un-damaged fuselage section and for a number of models corresponding to a set of possible damaged fuselage sections, being this simulation phase able to analyze one or more failure modes.

A result presentation phase for the final design 35.

As the main differences between the optimizing method according to this invention and conventional optimizations method refers to the simultaneous use of the un-damaged model and several damaged models in the optimization loop, this will be the main subject of the following description.

Un-damaged Model

Figure 4:
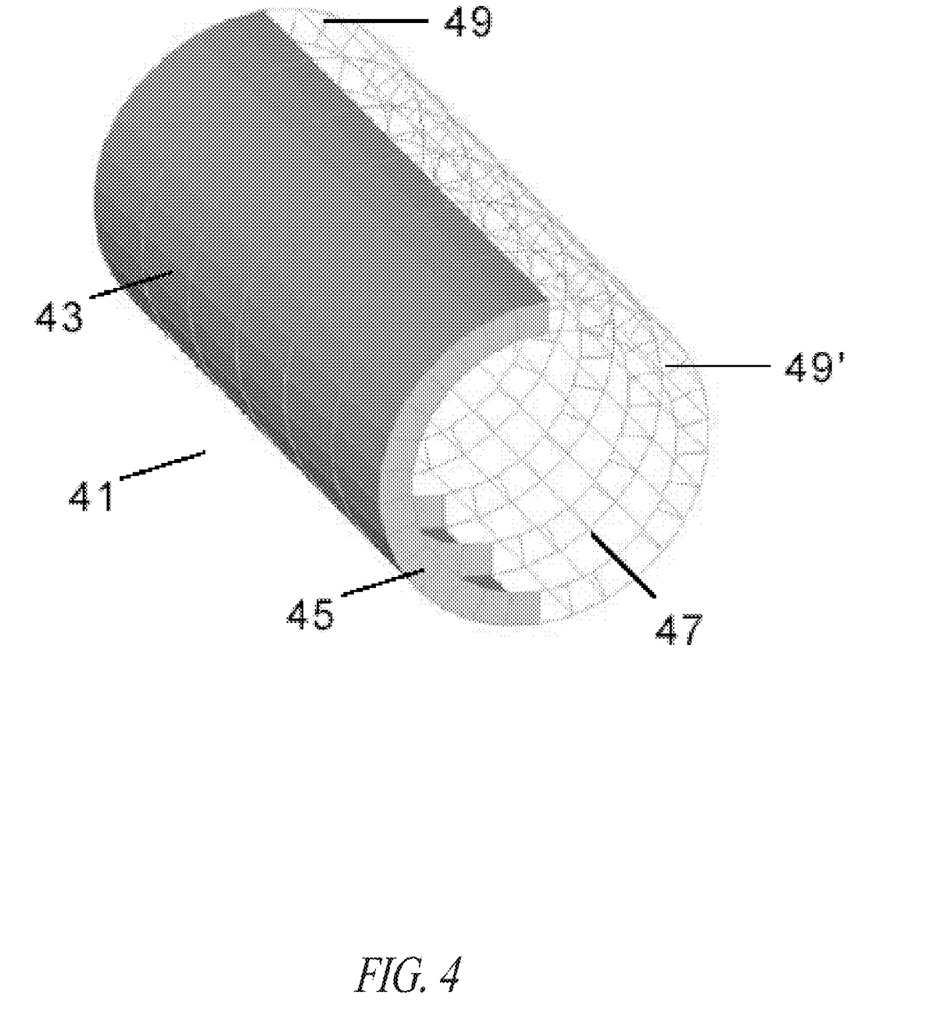
FIG. 4 is a schematic view of a barrel FE model used for the design of an aircraft fuselage section according to this invention.

As an example of a fuselage section to be optimized according to the present invention is has been chosen a fuselage section configured as a cylindrical barrel 41 comprising a skin 43, several transversal frames 45, longitudinal stiffeners 47 and other elements (inner and outer bars 49, 49').

FE Model

The main features of the FE model obtained in the preparation phase (see FIG. 4) are the following:

180 SHELL elements for skin 43. Thickness=0.003 mm.
210 SHELL elements for frames 45. Thickness=0.003 mm.
180 ROD elements for stringers 47. Area=100 mm2.
210 BAR elements for outer frame bars 49. Area=100 mm2, Ix=1000 mm4, Iy=3E5 mm4
420 BAR elements for internal frame bars 51. Area=100 mm2, Ix=1000 mm4, Iy=3E5 mm4
Main Material Parameters: E=7.4E7 KN/m2; G=2.7E7 KN/m2; v=0.37.

Design Variables

The design variables are the following:
Thickness of skin elements: 180 variables
Thickness of frame elements: 210 variables
Cross area of stringers: 180 variables Design Constraints
The design constraints are the following:
SHELL elements of skin: Von Mises stress≤160 MPa; 1 mm≤thickness≤20 mm.
SHELL elements of frames: Von Mises stress≤160 MPa; 1 mm≤thickness≤20 mm.
ROD elements of stringers: −160 Mpa≤σ≤160 MPa; 10 mm2≤area≤1000 mm2.

Loads and Boundary Conditions
The main load and boundary conditions are the following:
Loads applied at the center of the first frame with RBE3:
Mx=1000 KN•m, Fy=−750 KN, Fz=−750 KN
Boundary conditions of end frame nodes: ux=uy=uz=0

Damaged Models
Conceptually a damaged model is a model corresponding to the aircraft fuselage section after receiving the impact of a released blade following a given trajectory.

The FE model is therefore obtained eliminating (or degrading) from the FE model for the un-damaged fuselage those elements affected by the hypothetical trajectory of the released blade. It is assumed that the energy of the released blade is infinite and therefore in case of impact it will cause the collapse of any element of the fuselage section within its trajectory.

The design variables of a damaged model are the same than the design variables of the un-damaged model. However the design constraints and load conditions of a damaged model may be different than those of the un-damaged model because it is considered that, in the event of an impact of a released blade, the aircraft objective it is not continuing the planned flight under standard flight conditions but in a so-called sub-standard conditions for landing as soon as possible. Consequently it can be considered minor loads and constraints for the damaged models than for the un-damaged model.

Figure 5:
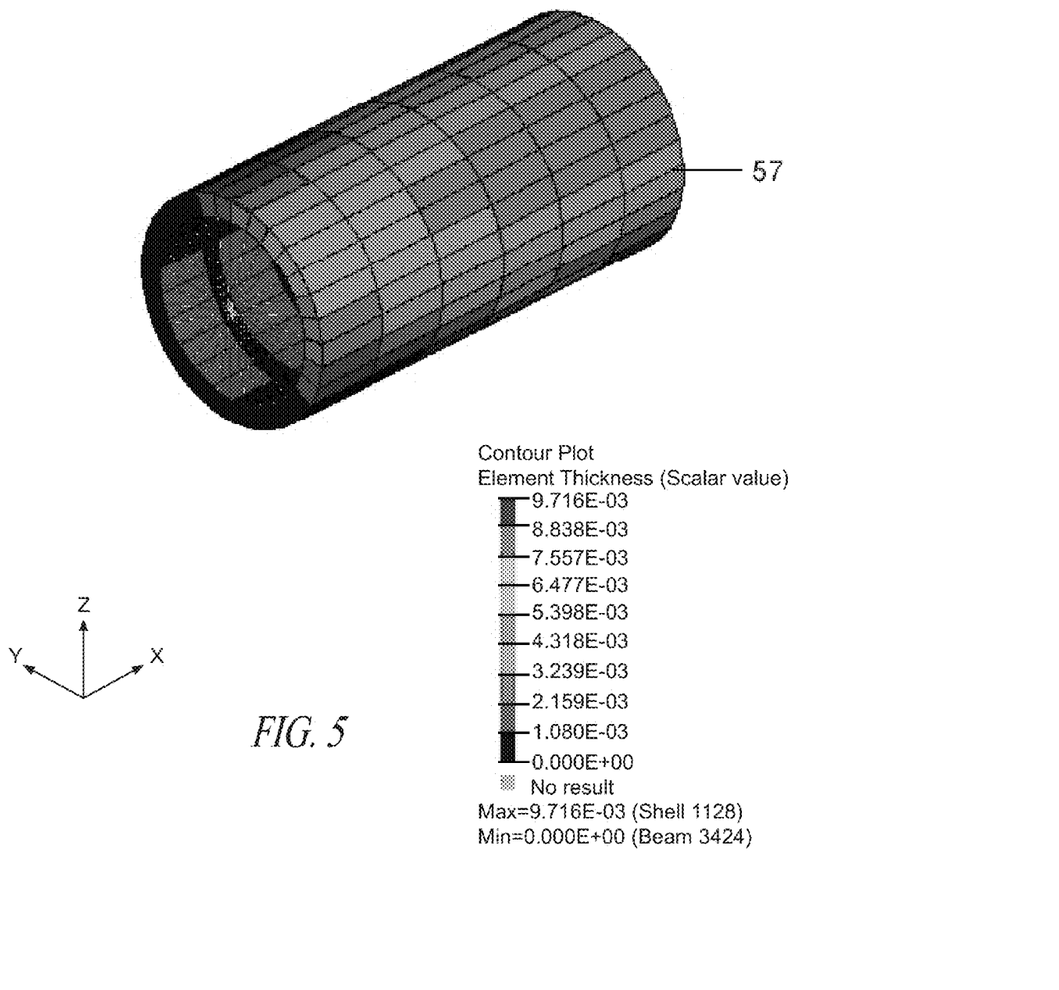
FIG. 5 is a perspective view of aircraft fuselage section showing the results obtained using a prior art optimization method.

Optimization Loop
In an optimization loop for only the un-damaged model the results that would be obtained are illustrated in the final model 57 shown in FIG. 5 using a color code in each element of the fuselage representing its thickness. The maximum thickness is 9.72 mm and the Optimum Volume (the target function) is 0.1697 m3.

As the skilled man will easily understand said optimization loop uses a suitable optimization engine that will compute the variation of the safety margin of each associated failure criterion directing the volume of fuselage towards a minimum value.

Figure 6:
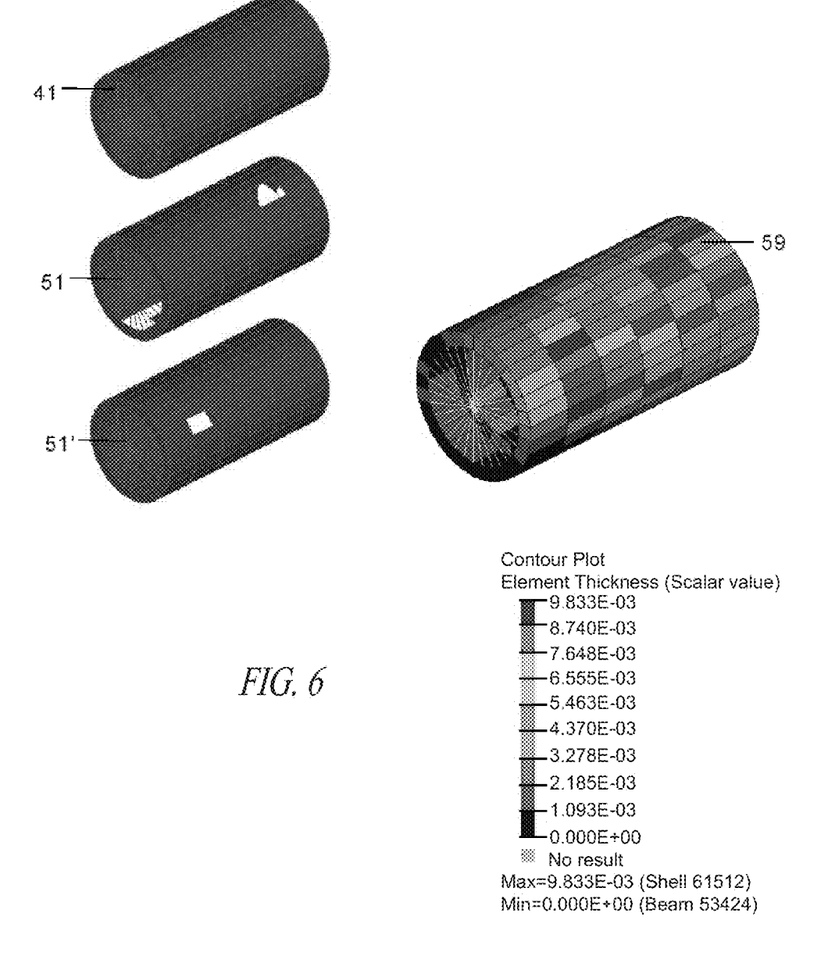
FIG. 6 is a perspective view of aircraft fuselage section showing the results obtained using the optimization method according to this invention for the un-damaged model and two damaged models.

As above-mentioned in the optimization method according to the present invention the optimization loop is carried out simultaneously (see FIG. 6) for the un-damaged model 41 and one or more damaged models selected considering suitable trajectories of the released blade (two models 51, 51' in the case illustrated in FIG. 6).

$$X^0=(x_1, \ldots, x_n).$$

In general terms, the optimization problem can be formulated as follows: given the design variables $x^0=(x_1, \ldots, x_n)$ minimize a target function VOL (the volume of the fuselage which is proportional to the weight) subject to constraints $g_j^d(x^d) \leq 0; j=1, \ldots, J_d; d=0, \ldots, D$, where $X^d$ corresponds to a damaged model d, being $X^d \subset X^0$.

The results obtained in an optimization loop for the un-damaged model 41 and two damaged models 51, 51' are shown in the final model 59 in FIG. 6 using the same color code than in FIG. 5. The maximum thickness is 9.83 mm and the Optimum Volume is 0.1957 m3.

Figure 7:
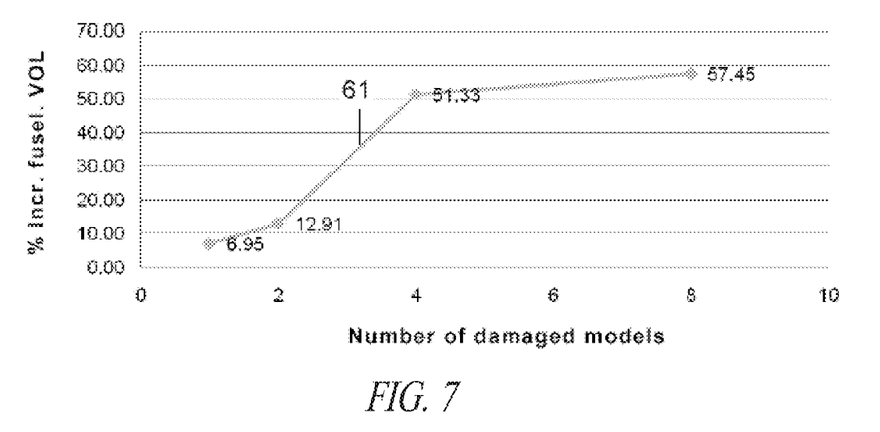
FIG. 7 is a graph showing the final results obtained using the optimization method according to this invention for different numbers of damaged models

Parametric Analysis
FIG. 7 shows in line 61 the results obtained for a number of damaged models in terms of the increase of the target function (volume) with respect to the result obtained for the un-damaged model, using the same load for the un-damaged and the damaged models.

Figure 8:
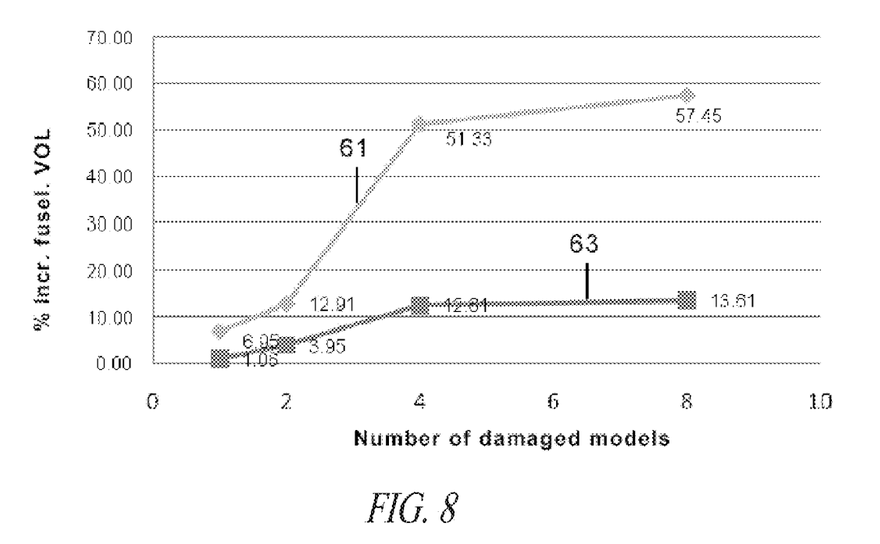
FIG. 8 shows the same graph of FIG. 7 and a similar graph using a less severe load case for the damaged models than for the un-damaged model.

FIG. 8 shows the same line 61 of FIG. 7 and line 63 shows the obtained optimized volume for the same number of damaged models in terms of the increase of the target function with respect to the result obtained for the un-damaged model, using a load P for the un-damaged model and a load P/1.5 for the damaged models.

Those examples clearly illustrated the advantages of the present invention for achieving an optimized design of a fuselage section subject to a PBR event.

As the skilled man will easily understand the multi-model optimization method according to the present invention can be applied to other parts, using different design variables, target functions and constraints.

Although the present invention has been fully described in connection with preferred embodiments, it is evident that modifications may be introduced within the scope thereof, not considering this as limited by these embodiments, but by the contents of the following claims.

What is claimed is:
1. A computer-aided method for carrying out a structural design to optimize a target function of an aircraft fuselage section subjected to the possibility of suffering damage having significant effects on the structural integrity of said aircraft fuselage section, the method comprising:
obtaining finite element models that include relevant information for an optimization analysis for the aircraft fuselage section in an undamaged condition and for the aircraft fuselage section in at least one damaged condition, consisting of a replica of said aircraft fuselage section in the undamaged condition but eliminating or degrading damaged zones of said aircraft fuselage section;
defining at least one design variable of said aircraft fuselage section;
defining at least one design constraint and one load case for said aircraft fuselage section in the undamaged condition;
defining at least one design constraint and one load case for said aircraft fuselage section in the at least one damaged condition;
providing at least one simulation module for analyzing one or more failure modes of said aircraft fuselage section; and
iteratively modifying the at least one design variable of said aircraft fuselage section for the purpose of optimizing said target function by analyzing simultaneously said undamaged condition and said at least one damaged condition using said at least one simulation module, the undamaged condition being analyzed using the at least one design constraint and one load case for said aircraft fuselage section in the undamaged condition and the at least one damaged condition being analyzed using the at least one design constraint and one load case for said aircraft fuselage section in the at least one damaged condition.

2. A computer-aided method according to claim 1, wherein the load case and the design constraint for said aircraft fuselage section in the at least one damaged condition are different than the load case and the design constraint for the aircraft fuselage section in the undamaged condition.

3. A computer-aided method according to claim 1, wherein:
- said aircraft fuselage section has a configuration that comprises at least a skin and several transversal frames and longitudinal stiffeners;
- and wherein said damages having significant effects on the structural integrity of said aircraft fuselage section are produced by one or more of the following events:
- a Propeller Blade Release (PBR) event;
- an Uncontained Engine Rotor Failure (UERF) event;
- an ice shedding event.

4. A computer-aided method according to claim 3, characterized in that one possible damaged fuselage section is a replica of the un-damaged fuselage section but eliminating, or degrading the properties of, those zones belonging to said skin, said frames and said stiffeners that will be directly involved in one of said events.

5. A computer-aided method according to claim 4, characterized in that:
- the load case for the un-damaged fuselage section is a load case corresponding to standard flight conditions; and
- the load case for a damaged fuselage section is a load case corresponding to flight conditions that are different than the standard flight conditions.

6. A computer-aided method according to claim 3, wherein:
- the aircraft fuselage section is made with composite materials;
- the main design variables are the thickness of skin and frames and the cross area of stringers; and
- the target function to be optimized is the volume of the aircraft fuselage section.

* * * * *